US008032074B2

(12) United States Patent
Kim et al.

(10) Patent No.: US 8,032,074 B2
(45) Date of Patent: Oct. 4, 2011

(54) METHOD AND DEVICE FOR SETTING CONNECTION TYPE OF DUAL TUNER

(75) Inventors: Jun-Hyung Kim, Seongnam-si (KR); Ho Yi, Seongnam-si (KR); Min-Haeng Cho, Seongnam-si (KR)

(73) Assignee: Humax Co., Ltd., Seongnam-Si, Gyeonggi-do (KR)

( * ) Notice: Subject to any disclaimer, the term of this patent is extended or adjusted under 35 U.S.C. 154(b) by 664 days.

(21) Appl. No.: 12/094,376

(22) PCT Filed: Nov. 28, 2006

(86) PCT No.: PCT/KR2006/005037
§ 371 (c)(1),
(2), (4) Date: May 20, 2008

(87) PCT Pub. No.: WO2007/064125
PCT Pub. Date: Jun. 7, 2007

(65) Prior Publication Data
US 2008/0276288 A1    Nov. 6, 2008

(30) Foreign Application Priority Data

Nov. 29, 2005  (KR) .................. 10-2005-0114502
Nov. 14, 2006  (KR) .................. 10-2006-0112126

(51) Int. Cl.
*H04H 1/00*   (2006.01)

(52) U.S. Cl. .............. 455/3.02; 455/3.06; 455/12.1; 455/125; 455/187.1; 725/68; 725/44; 348/731

(58) Field of Classification Search .......... 455/3.01, 455/3.02, 3.03, 3.04, 3.06, 12.1, 67.13, 132, 455/67.11, 179.1, 103, 137, 226.1, 67.1, 125, 187.1; 370/401, 312; 725/70, 68, 63, 78, 80, 44, 39, 71, 100, 131, 151, 118, 105, 148; 348/731, E5.097
See application file for complete search history.

(56) References Cited

U.S. PATENT DOCUMENTS
6,272,312 B1   8/2001  Takayama et al. .......... 455/3.02
(Continued)

FOREIGN PATENT DOCUMENTS
WO    WO 03/085851 A1    10/2003

OTHER PUBLICATIONS
PCT International Search Report dated Feb. 23, 2007.

*Primary Examiner* — Tan Trinh
(74) *Attorney, Agent, or Firm* — KED & Associates LLP

(57) ABSTRACT

The present invention relates to a connection state setting method of a dual tuner and an apparatus. In accordance with an embodiment of the present invention, the method of setting a tuner connection state of n satellites in a digital broadcast receiver having the plurality of tuners, n being a natural number, that are connected to one or more antennas includes setting the tuner connection state for each satellite by using a satellite signal inputted from each satellite, which has information on one antenna, and setting the tuner connection state between the satellites by using a connection state set for each satellite and the satellite signal inputted from each satellite. Accordingly, with the present invention, the digital broadcast receiver having two tuners can automatically set the connection state of satellite lines of each tuner.

24 Claims, 10 Drawing Sheets

U.S. PATENT DOCUMENTS

| | | | |
|---|---|---|---|
| 7,945,932 B2* | 5/2011 | James et al. | 725/68 |
| 2002/0038458 A1* | 3/2002 | Staal et al. | 725/78 |
| 2004/0068751 A1* | 4/2004 | Basawapatna et al. | 725/117 |
| 2004/0203425 A1* | 10/2004 | Coffin, III | 455/67.11 |
| 2005/0055729 A1* | 3/2005 | Atad et al. | 725/118 |
| 2005/0124289 A1* | 6/2005 | Coffin, III | 455/3.02 |
| 2005/0190777 A1* | 9/2005 | Hess et al. | 370/401 |
| 2005/0193419 A1* | 9/2005 | Lindstrom et al. | 725/71 |
| 2006/0271966 A1* | 11/2006 | Staal et al. | 725/68 |
| 2006/0277578 A1* | 12/2006 | Goldblatt et al. | 725/68 |
| 2007/0242633 A1* | 10/2007 | Roberts et al. | 370/312 |
| 2008/0134243 A1* | 6/2008 | Klosterman | 725/44 |

* cited by examiner

FIG. 8

|   | 1 | 2 | 3 | 4 | ···N |
|---|---|---|---|---|---|
| 1 | A | B | B | B | B |
| 2 | C | A | B | B | B |
| 3 | C | C | A | B | B |
| 4 | C | C | C | A | B |
| ⋮ N | C | C | C | C | A |

820
810
830

METHOD AND DEVICE FOR SETTING CONNECTION TYPE OF DUAL TUNER

CROSS-REFERENCE TO RELATED APPLICATIONS

This application claims the benefit of PCT application PCT/KR2006/005037 filed on Nov. 28, 2006, which is hereby incorporated by reference, which claims priority under 35 U.S.C. §119 to Korean Application Nos. 10-2005-0114502 filed on Nov. 25, 2005 and 10-2006-0112126 filed on Nov. 14, 2006, whose entire disclosures are hereby incorporated by reference.

TECHNICAL FIELD

The present invention relates to a digital broadcast receiver, more specifically to a method and an apparatus for setting a connection state between N satellites in a digital broadcast receiver employing two tuners.

BACKGROUND ART

A digital broadcast receiver, such as a digital TV and a set top box (STB), has been widely used recently. As illustrated in FIG. 1, this typical digital broadcast receiver functions as the set top box that performs personal video recoding (PVR), which writes and stores a digital broadcast program in large capacity writing means such as a hard disk drive (HDD). Also, the digital broadcast receiver is connected to a satellite broadcast antenna 20 and a television 40.

The satellite broadcast antenna 20, for receiving a digital satellite broadcast re-broadcasted through a plurality of satellites, receives and outputs to a digital broadcast receiver 30 a digital satellite broadcast re-broadcasted by a transponder. The transponder receives an electric wave transmitted from a broadcast station on the ground and amplifies and re-transmits to the ground the received electric wave.

Provided in the center of the satellite broadcast antenna 20 is a low noise block down converter (LNB), which converts a frequency of 4 to 12 GHz to frequency of 1 GHz.

The digital broadcast receiver 30 restores and processes the original video and audio signals of a digital broadcast program of MPEG2 transport stream, received through the satellite broadcast antenna 20. Then, the digital broadcast receiver 30 outputs and displays the video and audio signals through a television 40 such that a user can watch a desired digital broadcast program.

The digital broadcast receiver 30 can employ two tuners to allow the user to record a channel while watching another channel. The tuner tunes satellite signals inputted through the LNB to a signal of a particular preset frequency.

However, a conventional digital broadcast receiver 30 is restricted to use the two tuners in accordance with the number of LNBs that receive satellite signals.

For example, when polarization, high band and low band are selected in one LNB, if a particular frequency (e.g. horizontal polarization and high band) is received only, all tuners tune to a specific frequency within one satellite signal.

Owing to this restriction, the digital broadcast receiver 30 requires a user to set a loop-through mode or a separate mode through a user menu. In the loop-through mode, two tuners share an LNB signal provided through one signal line. In the separate mode, each tuner independently tunes a different LNB signal provided through two signal lines.

In case that LNB signals received through the two signal lines are the same, the digital broadcast receiver 30, which has set the connection mode of the satellite signal for two tuners, makes the two tuners search for a channel or copy a channel, searched from one tuner, to the other tuner.

However, it is not easy for a general user who uses the digital broadcast receiver employing two tuners to understand the restriction. If the user wrongly sets the two tuners as the loop-through mode or separate mode, the two tuners can not function properly.

DISCLOSURE

Technical Problem

The present invention, to solve the problem of the above-described conventional art, provides a method and an apparatus for setting a connection state of a dual tuner that can allow a satellite line connection state of each tuner to be automatically set in the digital broadcast receiver employing two tuners.

The present invention also provides a method and an apparatus for setting a connection state of a dual tuner that can improve a user's convenience by automatically setting a satellite signal line connection state of each tuner, which is complicated to set.

Moreover, the present invention provides a method and an apparatus for setting a connection state of a dual tuner that can reduce the possibility of erroneously setting the tuner, which has been frequently generated, due to having the same transponder (TP) information for different satellites in case that a digital satellite equipment control (DiSEqC) switch is used.

Moreover, the present invention provides a method and an apparatus for setting a connection state of a dual tuner that can set a connection state of each tuner as any one of a single type, a loop-through type, a dual same type and a dual different type.

Furthermore, the present invention provides a method and an apparatus for setting a connection state of a dual tuner that can improve a user's convenience by setting a tuner connection state between satellites to have a connection state of each tuner pre-recognized when a new channel is added to channels reserved for recoding or watching.

Technical Solution

An aspect of the present invention features a method of setting a tuner connection state of n satellites, n being a natural number, the satellites being connected to one or more antennas, executed in a digital broadcast receiver having a plurality of tuners.

According to an embodiment of the present invention, a method of setting a tuner connection state of n satellites, n being a natural number, the satellites being connected to one or more antennas, executed in a digital broadcast receiver having a plurality of tuners includes the steps of setting the tuner connection state for each satellite by using a satellite signal received from each satellite, and setting the tuner connection state of the tuners between the satellites by using a connection state set for each satellite and the satellite signal received from each satellite.

The step of setting the tuner connection state for each satellite includes the steps of determining whether each of a first tuner and a second tuner is tuned, by tuning each of the first tuner and the second tuner to a first satellite signal received from a satellite; if each of the first tuner and the second tuner is tuned, extracting program specification information (PSI) or service information (SI) from the first satellite signal inputted through the first tuner and the second tuner, respectively, and determining whether the PSI or SI extracted from the first satellite signal inputted through the first tuner and the PSI or SI extracted from the first satellite signal inputted through the second tuner are identical to each other; tuning any one of the first tuner and the second tuner to a second satellite signal having polarization properties different from the first satellite signal if it is determined that the PSI or SI extracted from the first satellite signal inputted through the first tuner and the PSI or SI extracted from the first satellite signal inputted through the second tuner are identical to each other; and setting the connection state of the satellite as dual same if the first tuner and the second tuner are tuned by the first satellite signal and the second satellite signal, respectively.

The step of setting the tuner connection state between the satellites by using a connection state set for each satellite includes the steps of tuning each of the first tuner and the second tuner to the third satellite signal, extracting program specification information (PSI) or service information (SI) from the third satellite signal inputted through the first tuner, tuning the first tuner to a fourth satellite signal, the fourth satellite signal being a signal for a satellite that is different from the satellite of the third satellite signal, extracting second PSI or SI from the third satellite signal inputted through the second tuner, determining whether the extracted first PSI or SI is identical to the extracted second PSI or SI and setting the connection state of the satellites as dual different if the extracted first PSI or SI is identical to the extracted second PSI or SI.

Another aspect of the present invention features a digital broadcast receiver of setting a tuner connection state of n satellites, n being a natural number, the satellites being connected to one or more antennas.

According to an embodiment of the present invention, a digital broadcast receiver includes a plurality of tuners, receiving from each antenna a satellite signal transmitted from a satellite; a demodulator, demodulating the satellite signal; a demultiplexer, classifying the demodulated satellite signal in accordance with data type and outputting the classified data; a decoder, decoding each of the data classified by the demultiplexer; and a processor, setting a tuner connection state corresponding to N satellites, N being a natural number, by use of the satellite signal inputted through the tuner, whereas the processor sets a connection state of the tuner for each satellite, each satellite having information for one satellite, and then sets a tuner connection state between the satellites by using the connection state set for each satellite.

Advantageous Effects

By providing a method and an apparatus for setting a connection state of a dual tuner in accordance with the present invention, a satellite line connection state of each tuner can be automatically set in the digital broadcast receiver employing two tuners.

With the present invention, a user's convenience can be improved by automatically setting a satellite line connection state of each tuner, which is complicated to set. With the present invention, the possibility of erroneously setting the tuner, which has been frequently generated, can be reduced by having the same TP information for different satellites in case that a digital satellite equipment control (DiSEqC) switch is used.

With the present invention, a connection state of each tuner can be set as any one of a single type, a loop-through type, a dual same type and a dual different type.

With the present invention, a user's convenience can be improved by setting a tuner connection state between satellites to have a connection state of each tuner pre-recognized when a new channel is added to channels reserved for recoding or watching.

DESCRIPTION OF DRAWINGS

FIG. 8 is a state table for setting a connection state of setting M antennas in accordance with an embodiment of the present invention;

MODE FOR INVENTION

Figure 1:
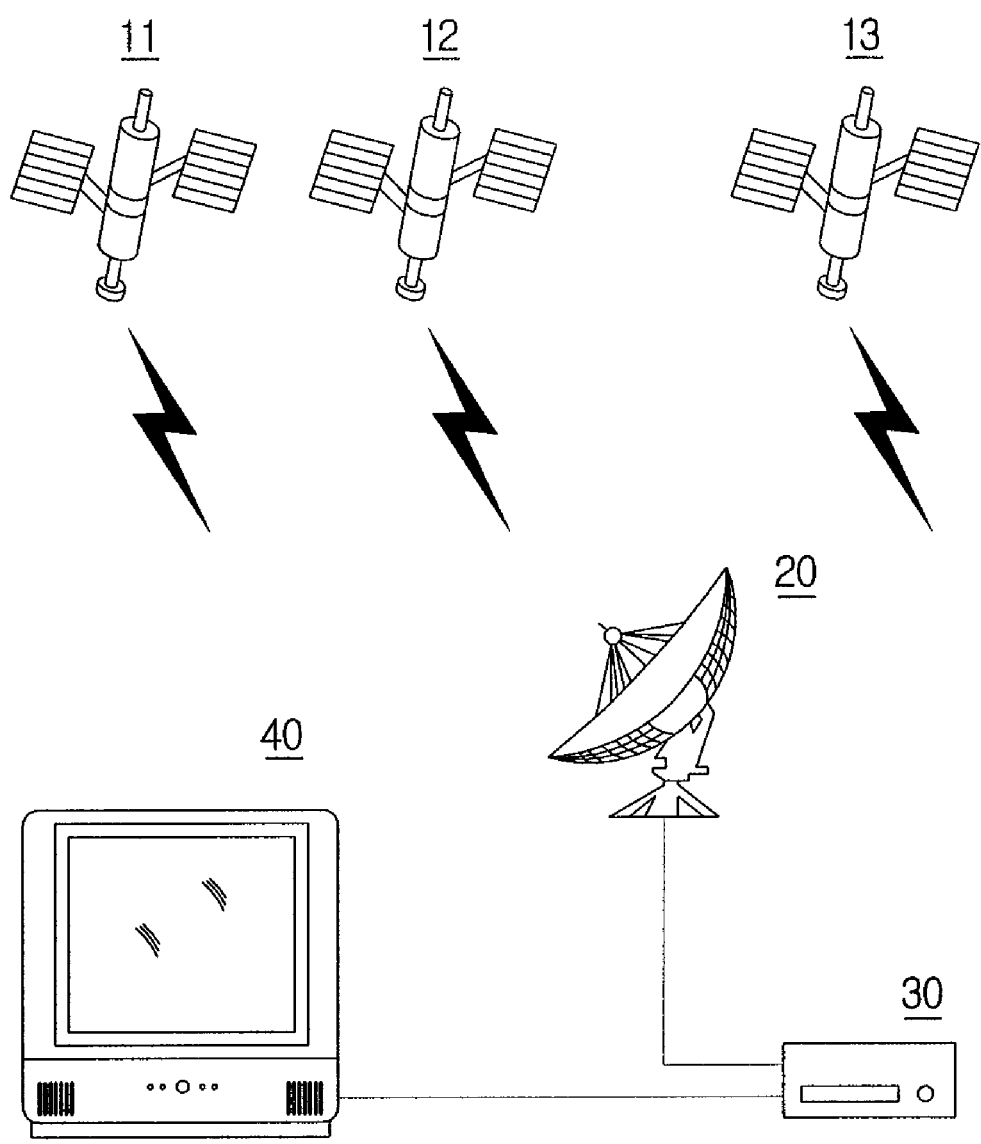
FIG. 1 illustrates a connection state of a general digital broadcast receiver.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals.

Hereinafter, the embodiments will be described with reference to the accompanying drawings, examples of which are illustrated in the accompanying drawings, wherein like reference numbers refer to like elements throughout. Throughout the description of the present invention, when describing a certain technology is determined to evade the point of the present invention, the pertinent detailed description will be omitted.

Figure 2:
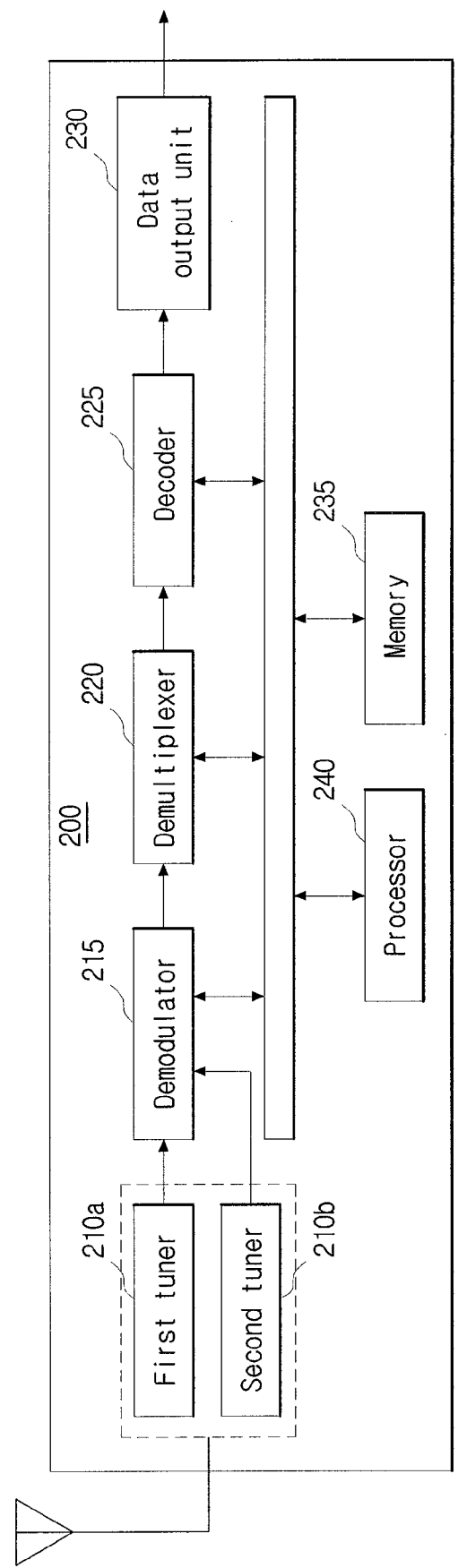
FIG. 2 is a block diagram illustrating an inside structure of a digital broadcast receiver in accordance with an embodiment of the present invention.
Figure 3:
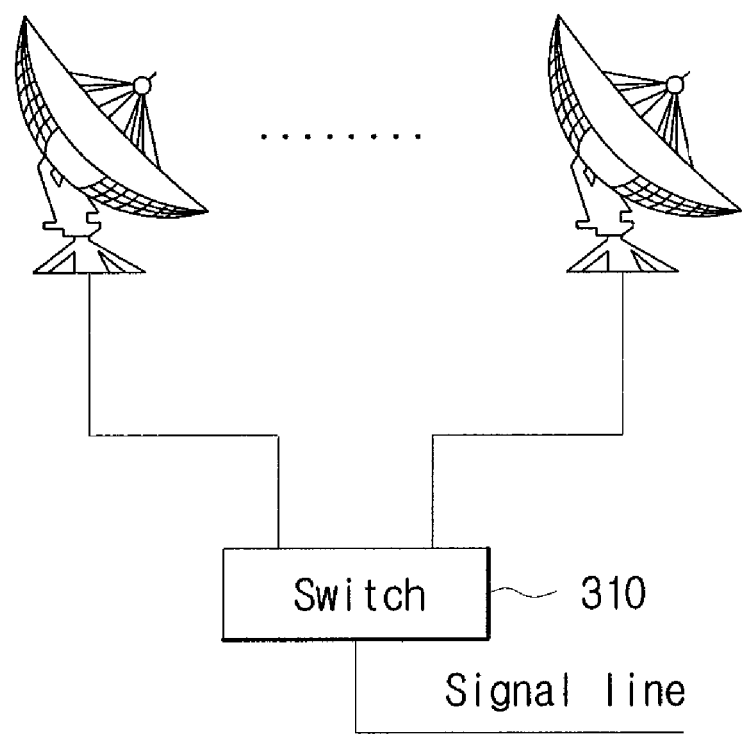
FIG. 3 and FIG. 4 illustrate a connection mode of a digital broadcast receiver and a satellite.
Figure 4:
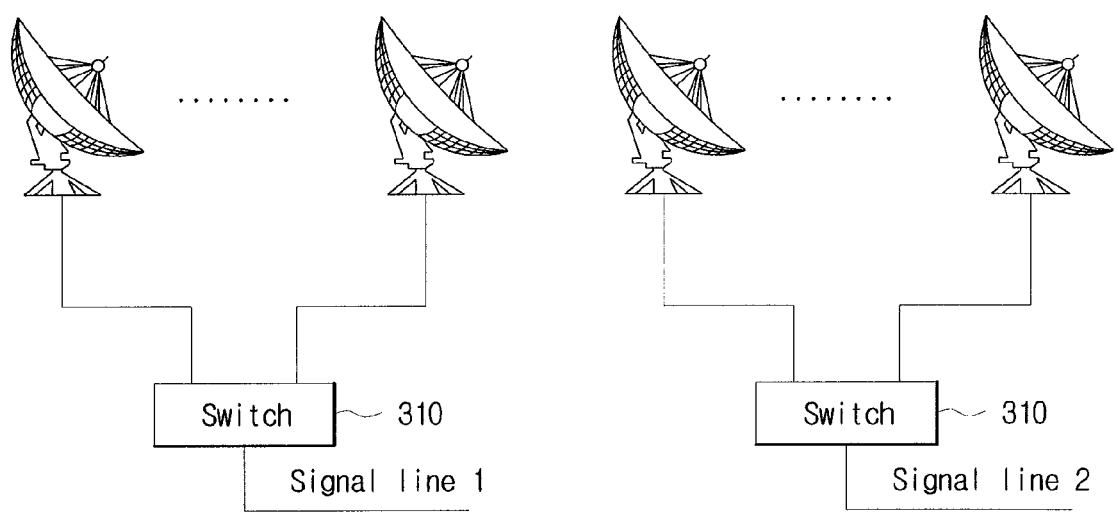
Figure 5:
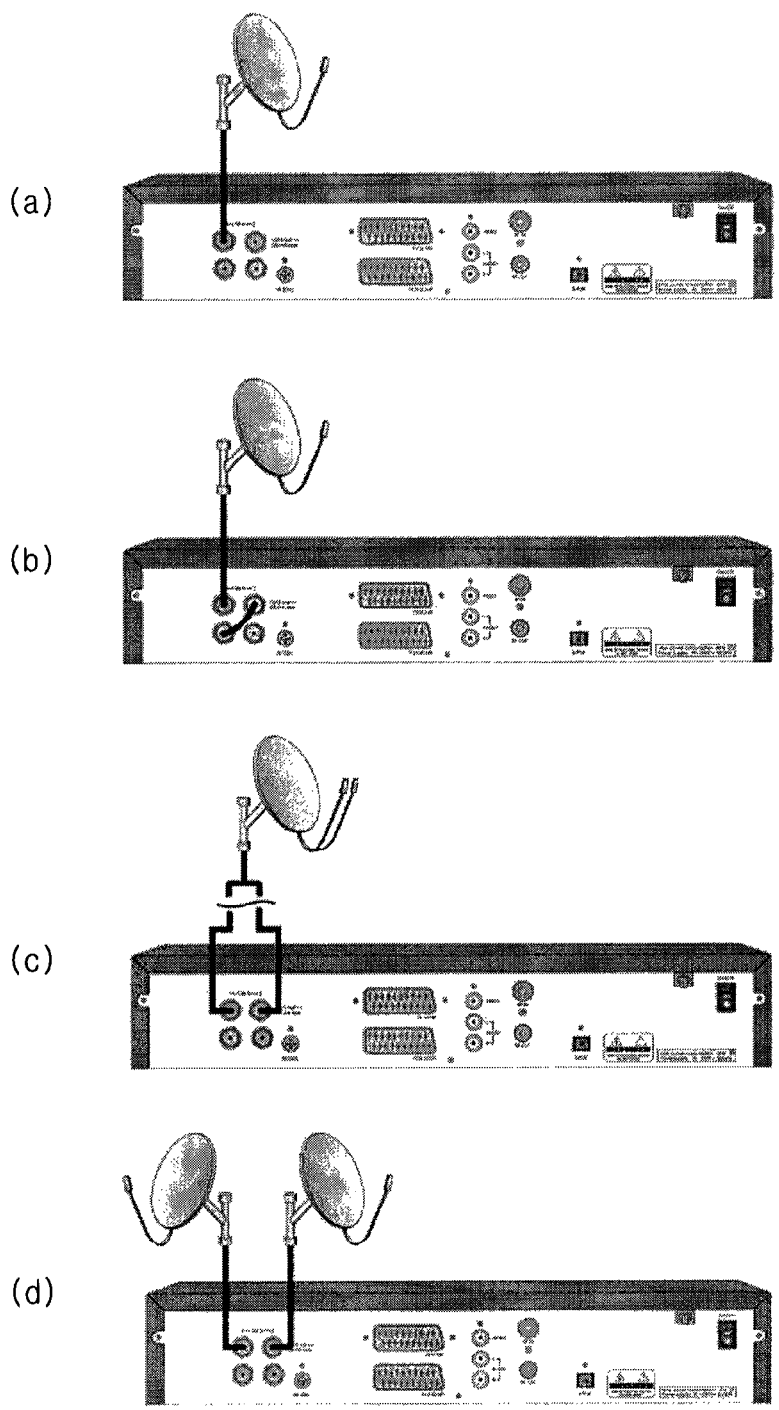
FIG. 5 illustrates a connection mode of two tuners in a digital broadcast receiver.

FIG. 2 is a block diagram illustrating an inside structure of a digital broadcast receiver in accordance with an embodiment of the present invention, and FIG. 3 and FIG. 4 illustrate a connection mode of a digital broadcast receiver and a satellite. FIG. 5 illustrates a connection mode of two tuners in a digital broadcast receiver.

Referring to FIG. 2, a digital broadcast receiver 200 in accordance with the present invention comprises two tuners 210a and 210b, a demodulator 215, a demultiplexer 220, a decoder 225, a data output unit 230, a memory 235 and a processor 240. FIG. 2 illustrates the digital broadcast receiver 200 employing two tuners only. However, it shall be evident that the digital broadcast receiver 200 in accordance with the present invention can have two or more tuners. Similarly, FIG. 2 illustrates that the digital broadcast receiver 200 includes one demultiplexer 220 and one decoder 225. However, the digital broadcast receiver 200 in accordance with the present invention can have the same numbers of the demultiplexer 220 and the decoder 225, respectively, as the number of the provided tuners 210 in accordance with a method of embodying the digital broadcast receiver 200.

The demodulator 215, by the control of the processor 240, demodulates and transfers to the demultiplexer 220 a signal (i.e. an electrical signal) inputted through the tuners 210a and 210b.

The demultiplexer 220 parses an audio signal, a video signal and data, demodulated and inputted by the demodulator 215, and divides the audio signal, the video signal and the data in accordance with each data type to output the respective divided signals to the decoder 225. In the drawing, one decoder 225 is illustrated. It is evident, however, that the decoder 225 can be realized as a video decoder, an audio decoder and a data decoder in accordance with the function of the decoder 225. The data type can be video data, audio data and/or information data.

The decoder 225 decodes the original audio, video and data signals (hereinafter, referred to as "information data" for the convenience of understanding and description) by decoding the respective data, divided and inputted by the demultiplexer 220 by the control of the processor 240, in accordance with a predetermined method. Also, the decoder 225, by the control of the processor 240, outputs through the output unit 230 or stores in the memory 235 the respective data. FIG. 2 illustrates that one decoder 225 decodes the video, audio and information data. However, it is shall be evident that an individual decoder (e.g. a video decoder, an audio decoder and an information decoder) can be provided to decode each kind of data.

The memory 235 can include a volatile memory and a non-volatile memory. The video data, the audio data and the information data, decoded by the decoder 225, are written in the memory 235 by the control of the processor 240. The memory 235 also stores an algorithm to operate the digital broadcast receiver 200 in accordance with the present invention.

The data output unit 230, by the control of the processor 240, outputs the video and/or audio data stored in the memory 235 or outputs the information data by the on-screen display (OSD) method. The OSD indicates a screen of a display apparatus (e.g. a monitor or a television), coupled to the data output unit 230, on which desired information is self-displayed without the input of an additional video signal. Of course, the data output unit 230 can output the respective data, decoded by the decoder 225, to the display apparatus by the control of the processor 240.

The processor 240 controls internal elements of the digital broadcast receiver 200 in accordance with the present invention (e.g. the tuners 210a and 210b, the demodulator 215, the demultiplexer 220, the decoder 225, the data output unit 230 and memory 235).

Also, the processor 240 can set a connection state between each satellite and a tuner 210a or 210b corresponding to each satellite. This will be described below with reference to the related drawings.

In the digital broadcast receiver, the connection type of the satellite signal line can be classified in accordance with the number of signal lines. For example, in case that one signal line is provided, as illustrated in FIG. 3, only one signal is connected to the satellite signal line at a time by connecting a digital satellite equipment control (DiSEqC) switch (not shown) in accordance with the number of the LNB. As illustrated in FIG. 4, in case that two signal lines are provided, the same satellite signals or different satellite signals are connected to two DiSEqC switches. The DiSEqC switch automatically selects a plurality of satellite antennas with one satellite receiver. One receiver can typically receive signals from 4 antennas or polarized signals from up to 8 antennas.

First, a connection mode in accordance with a physical connection of satellite signal lines to each tuner will be briefly described for the convenience of understanding and the description. Hereinafter, the connection mode will be described based on the case of two tuners.

As illustrated in (a) of FIG. 5, a case in which any one (e.g. a first tuner 210a) of the two tuners 210a and 210b is connected to the satellite signal line is referred to as a "single tuner." That is, the single tuner represents a mode in which any one of the two tuners is only used. For the convenience, the mode in which only the first tuner 210a (refer to FIG. 2) is connected to the satellite signal line is referred to as a "first single tuner." Another mode in which only a second tuner 220b (refer to FIG. 2) is connected to the satellite signal line is referred to as a "second single tuner."

As illustrated in (b) of FIG. 5, a connection mode in which the two tuners 210a and 210b are connected to one satellite signal line, and the same satellite signal is inputted to the first tuner 210a and the second tuner 210b, is referred to as a "loop-through." That is, in the loop-through connection mode, an output part of the first tuner 210a and an input part of the second tuner 210b are connected. Accordingly, as illustrated in (b) of FIG. 5, a satellite signal received through the antenna can be inputted via an input part of the first tuner 210a and tuned. Then, the same satellite signal outputted through the output part of the first tuner 210a can be inputted via the input part of the second tuner 220b and tuned. Here, the same satellite signal means a signal of the same polarization properties inputted from the same satellite. A satellite can send a satellite signal of vertically polarized wave properties and another satellite signal of horizontally polarized wave properties. In case of the loop-through, since one satellite signal line is connected to the antenna, the tuners 210a and 210b, respectively, can be tuned by the satellite signals of the same polarization properties.

As illustrated in (c) of FIG. 5, two satellite signal lines are connected to the tuners 210a and 210b. The satellite signal lines connected to the tuners 210a and 210b are connected to one or more antennas. The tuners 210a and 210b can receive a satellite signal from the same satellite. This connection mode is referred to as a "dual same." In case of the dual same, since a satellite signal line is connected to each of the tuners 210a and 210b through the respective LNB, the tuners 210a and 210b can receive from the same satellite and tune to the respective satellite signal. For example, the first tuner 210a can receive and tune to a first satellite signal corresponding to the vertically polarized wave. The second tuner 210b can receive and tune to a second satellite signal corresponding to the horizontally polarized wave. In addition, as illustrated in (c) of FIG. 5, since the satellite signal lines connected to the respective tuners are coupled to one antenna, the first tuner 210a and the second tuner 210b, respectively, can receive signals of different polarization properties from the same satellite and be tuned.

As illustrated in (d) of FIG. 5, a connection mode in which each of the tuners 210a and 210b is connected to each satellite signal line through its own corresponding antenna is referred to as a "dual different." For example, in case of the dual different, since the input parts of the first and second tuners 210a and 210b are connected to the respective signal lines, the first and second tuners 210a and 210b can be independently tuned. Further, in case of the dual different, unlike the dual same, the satellite signal lines, each of which is connected to the first tuner 210a and the second tuner 210b, respectively, are connected to different satellites. The two tuners 210a and 210b are independently tuned by the different satellite signals.

Figure 6:
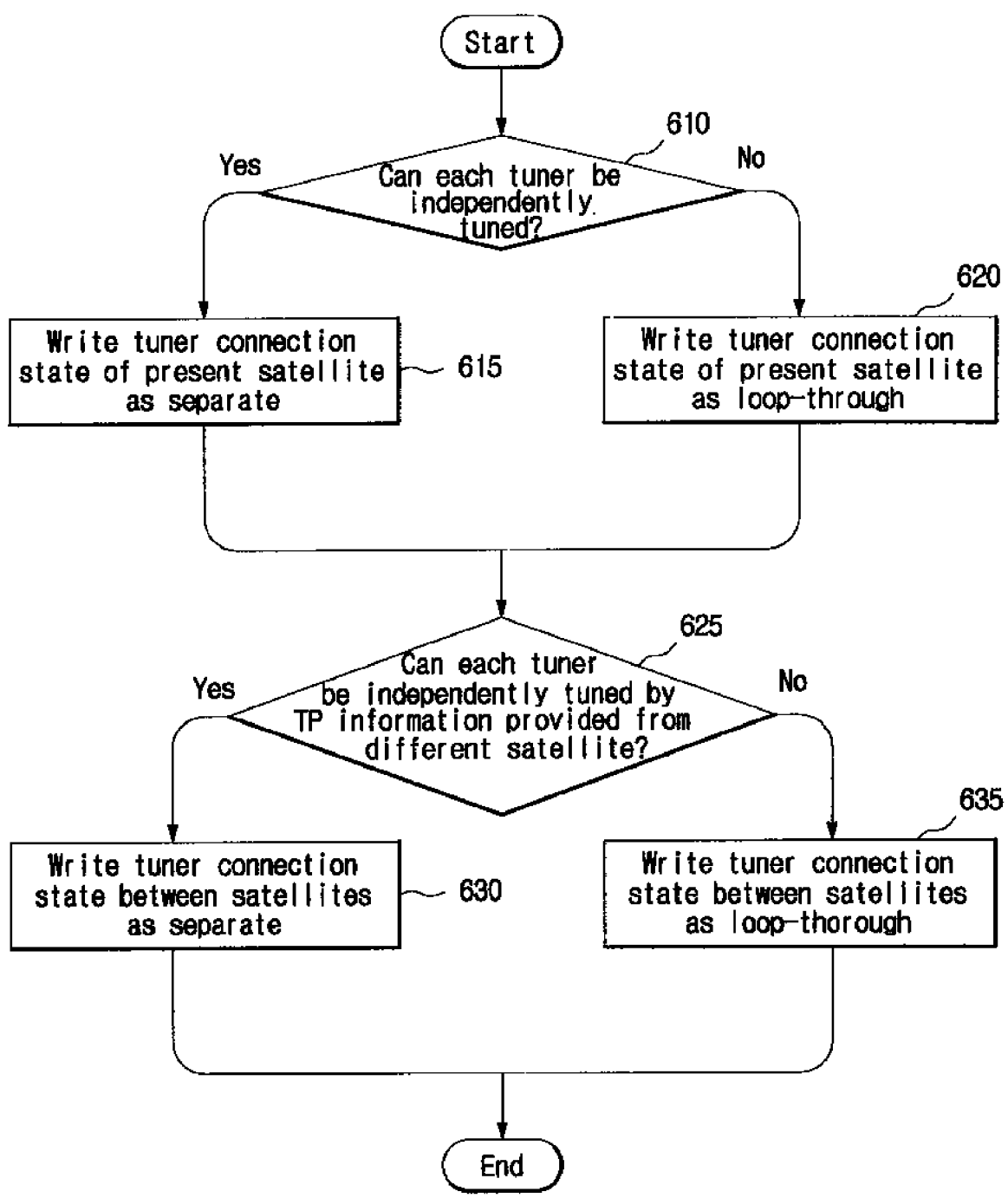
FIG. 6 is a flow chart illustrating a method in which a digital broadcast receiver checks a connection state of a plurality of tuners in accordance with an embodiment of the present invention.

FIG. 6 is a flow chart illustrating a method in which a digital broadcast receiver checks a connection state of a plurality of tuners in accordance with an embodiment of the present invention. It is hereinafter assumed that the digital broadcast receiver 200 employs two tuners 210a and 210b and the processor 240 sets and stores in the memory 235 an antenna connection state for M searched satellites, M being a natural number larger than zero. As such, when the connection state for the M searched satellites is stored, if the connection state for a satellite is required to be re-checked (e.g. a connection state in accordance with the change of antenna information through a menu of the channel search for a concerned satellite or the satellite state diagnosis is requested to be re-checked (or re-set)), the processor 240 can receive the satellite signal from a transponder corresponding to the concerned satellite and set the connection state for each of the tuners 210a and 210b.

In a step represented by 610, the processor 240 determines whether the first tuner 210a and the second tuner 210b, respectively, are tuned by using each satellite signal of different polarization properties that is received from a transponder corresponding to the present satellite K.

For example, the first tuner 210a can try to be tuned to the first satellite signal received from the transponder. The second tuner 210b can try to be tuned to the second satellite signal having different polarization properties. The first and second satellite signals can be received through the same satellite or different satellites.

If the first tuner 210a and the second tuner 210b are tuned by the respective TP information of different polarization properties, the processor 240 writes the connection state of the first and second tuners 210a and 210b in the memory 235 as the separate in a step represented by 615.

However, if the first tuner 210a and the second tuner 210b are not tuned by the respective TP information, the processor 240 writes the connection state of the first and second tuners 210a and 210b in the memory 235 as the loop-through in a step represented by 620.

If the connection state of the first and second tuners 210a and 210b for the present satellite K is set in steps represented by 610 through 620, the processor 240 sets the connection state of the first and second tuners 210a and 210b between the present satellite K and a searched satellite N. A method of setting the connection state is described below.

To set the connection state of the first and second tuners 210a and 210b between the present satellite K and a searched satellite N, the processor 240 tunes the first tuner 210a and the second tuner 210b by using the IP information received from the present satellite K (hereinafter, referred to as "first TP information" for the convenience of understanding and description) and the TP information received from the searched satellite N (hereinafter, referred to as "second TP information" for the convenience of understanding and description) and determines whether both the first tuner 210a and the second tuner 210b are tuned, in a step represented by 625.

For example, in case that the present satellite K and the searched satellite N employ the same antenna by using the same switch, the first tuner 210a and the second tuner 210b cannot be independently tuned at the same time.

Accordingly, the processor 240 tunes the first tuner 210a and the second tuner 210b by using the first TP information and the second TP information received from each respective satellite. As a result of tuning them, if the first and second tuners 210a and 210b are independently tuned, the processor 240 determines that the connection state of each of the tuners 210a and 210b between the present satellite K and the searched satellite N is the separate. If the first tuner 210a and the second tuner 210b, respectively, are independently tuned, in a step represented by 630, the processor 240 writes in the memory 235 the connection state of each of the tuners 210a and 210b between the present satellite K and the searched satellite N as the separate.

If the first tuner 210a and the second tuner 210b, respectively, are not independently tuned, in a step represented by 635, the processor 240 writes in the memory 235 the connection state of each of the tuners 210a and 210b between the present satellite K and the searched satellite N as the loop-through.

Here, the processor 240 can set a connection state of each of the tuners 210a and 210b between the present satellite K and respective searched satellites by repeating the steps represented by 625 through 635 M times.

Figure 7:
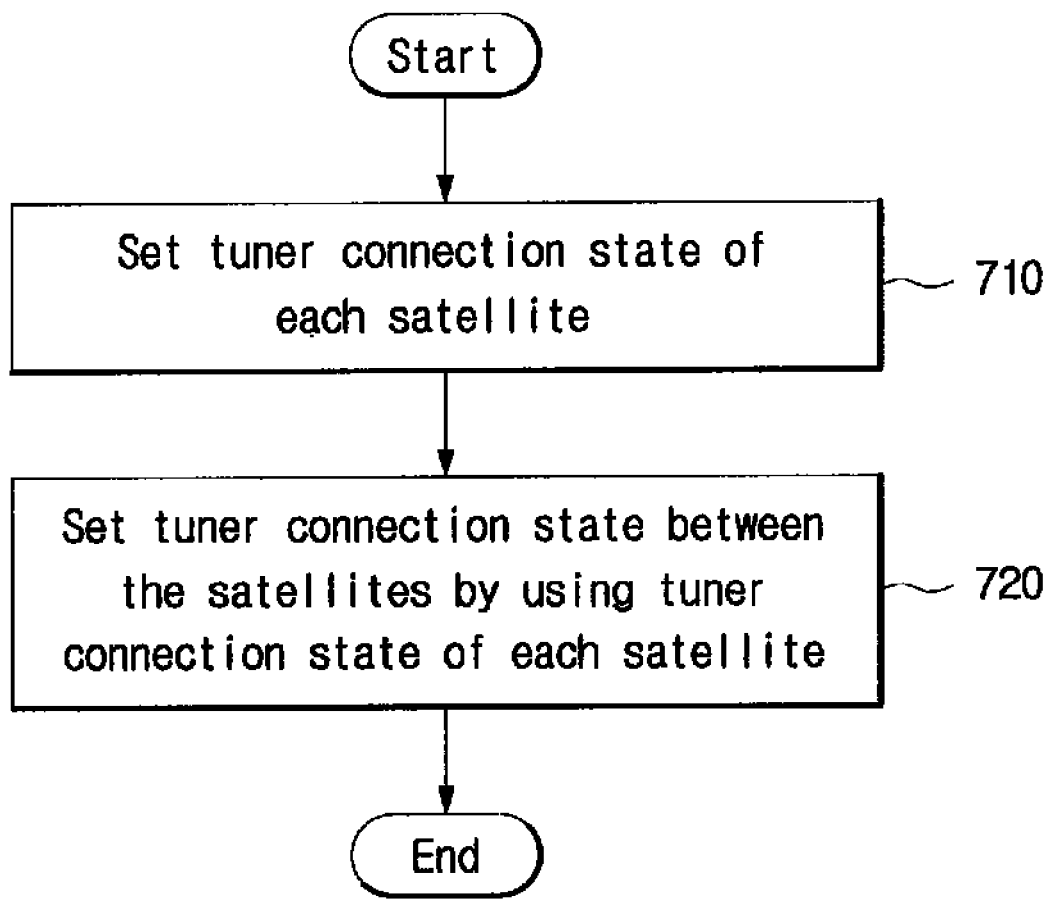
FIG. 7 illustrates a flow chart illustrating a method of setting a connection state of each tuner for M satellites searched by a digital broadcast receiver.

FIG. 7 illustrates a flow chart illustrating a method of setting a connection state of each tuner for M satellites searched by a digital broadcast receiver, and FIG. 8 is a state table for setting a connection state of setting M antennas in accordance with an embodiment of the present invention. The method of checking a connection state of the satellite signal line of each of the tuners 210a and 210b by automatically tuning without separate software setting will be described below in detail. It is assumed that the digital broadcast receiver 200 employs two tuners 210a and 210b. Also, the method of setting a connection state of each tuner 210a or 210b of the satellites and of between the satellites in a state that M satellites, M being a natural number, are searched will be hereinafter described. Here, since the method of searching M satellites and the method of setting antenna information for each satellite are well-known to those of ordinary skill in the art, the related description will be omitted.

Typically, a digital satellite broadcast signal is relayed through a transponder. The satellite broadcast antenna receives and transfers to the digital broadcast receiver 200 the digital satellite broadcast signal. The digital satellite broadcast signal received through each antenna is referred to as "TP information" or a "satellite signal" the convenience of understanding and description. The TP information or the satellite signal can be information in a transport stream unit. Also, the method of setting a connection state of each tuner 210a or 210b of the satellites and of between the satellites, corresponding to the set antenna information in a state that the satellite signal line connected to each antenna is physically coupled to each tuner 210a or 210b, will be described in detail.

Although the below description relates to the method of setting each antenna and connection state of the tuners 210a and 210b between the antenna settings for the setting of M antennas, the method of setting the connection state of M satellites and between the satellites will be described for the convenience of understanding and description.

If M satellites are searched through a plurality of antennas as illustrated in FIG. 8, the connection state of each tuner 210a or 210b of each satellite and between the satellites is set by checking the connection state M×M times.

Briefly describing FIG. 8, "A" represents each component, in which the two tuners 210a and 210b are tuned by using each of the TP information having different polarization properties received from each satellite (i.e. each of the TP information having different polarization properties received from one satellite). "B" and "C" represent components, in which the tuners 210a and 210b are tuned by using TP information received from different satellites. That is, B and C set the connection state between the satellites by using the connection state set by A. Since B and C are symmetrical with each other, and thus the connection state for any one component of B and C is required to be set and used, it is assumed that the connection state for one component is set.

Referring to FIG. 7, if M satellites are searched in a step represented by 710, first, the connection state of each satellite having corresponding antenna information is set. For example, referring to FIG. 8, a diagonal group 810 sets the connection state of each satellite having concerned antenna information. Accordingly, the tuner connection state of each satellite x, x being a natural number, can be checked by tuning the first tuner 210a and the second tuner 210b with a satellite signal transmitted from the satellite x.

For example, assuming that the first tuner 210a is tuned to the first satellite signal but the second tuner 210b is not tuned, the processor 240 can set the tuner connection of the satellite x as the first single tuner. This is described below in detail with reference to FIG. 9.

Once the whole tuner connection state of the respective M satellites is set, the processor 240 sets, in a step represented by 620, the connection state of the tuners 210a and 210b of each satellite (e.g. the first satellite and the second satellite) having different antenna information by using the connection state by the step represented by 610. This is described below in detail with reference to FIG. 10.

For example, referring to FIG. 8, since all connection states of each tuner 210a or 210b of the respective satellite x are set, the connection state of the tuners 210a and 210b of each satellite (i.e. the first satellite and the second satellite) having different antenna settings can be set by using the connection state of the satellite x.

Referring to FIG. 8, since a first area 820 and a second area 830 correspond to each other, the whole connection state can be set by setting the tuner connection state of each satellite for any one of the first area 820 and the second area 830.

Figure 9:
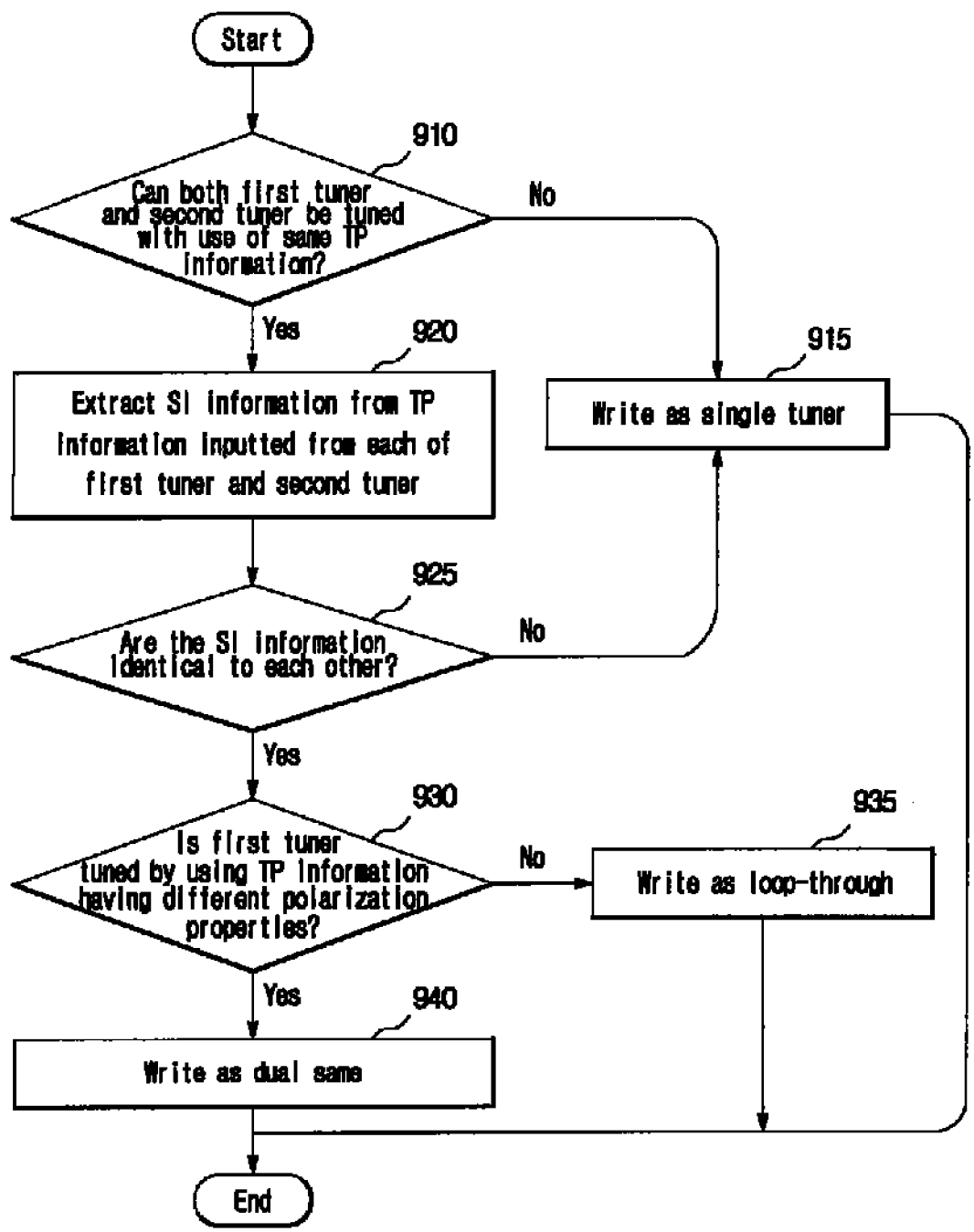
FIG. 9 is a flow chart illustrating a method of setting a connection state of setting M antennas in accordance with an embodiment of the present invention.

FIG. 9 is a flow chart illustrating a method of setting a connection state of setting M antennas in accordance with an embodiment of the present invention. The method of setting the connection state of each satellite x, x being a natural number larger than zero, of the diagonal group 810 will be described with reference to FIG. 8. That is, the method of setting the tuner connection state for the component A will be hereinafter described. Further, the method of setting each tuner connection state after receiving at least one item of TP information (i.e. satellite signal) having different polarization properties from at least one transponder corresponding to a satellite x will be described.

Although the below description relates to the method of setting the connection state for respective N antenna settings, the method of setting the connection state of N satellites will be described for the convenience of understanding and description.

Referring to FIG. 9, in a step represented by 910, the processor 240 determines whether the first tuner 210a and the second tuner 210b can be tuned by tuning each of the first tuner 210a and the second tuner 210b by use of the same satellite signal (hereinafter, commonly referred to as TP information).

If neither the first tuner 210a nor the second tuner 210b is tuned by using the same TP information, the processor 240 recognizes and writes in the memory 235 the connection state of the satellite x as the single tuner, using any one of the first tuner 210a and the second tuner 210b, in a step represented by 915.

However, if both the first tuner 210a and the second tuner 210b are tuned by using the same TP information, the processor 240 extracts program specification information (PSI) or service information (SI) from a satellite signal inputted from the first tuner 210a and the second tuner 210b, respectively, in a step represented by 920. Then, the processor 240 compares the extracted PSI or SI information with each other in a step represented by 925.

For example, let us assume that the PSI or the SI extracted through the first tuner 210a is referred to as a "first PSI" or a "first SI", and the PSI or the SI extracted through the second tuner 210b is referred to as a "second PSI" or a "second SI." If it is determined that each of the abstracted PSI or SI is identical to each other, the processor 240 can recognize the connection state as at least the loop-through. If it is determined that each of the abstracted PSI or SI is different from each other, the processor 240 can recognize that the TP information tuned by the first tuner 210a and the second tuner 210b is not transmitted from the same satellite. That is, the processor 240 can recognize that the concerned TP information overlaps in at least two satellites. The PSI or the SI is included in the digital video broadcasting (DVB) standard in accordance with the digital satellite broadcast, and the PSI is included in the MPEG-2 standard. Since the method of extracting the PSI or the SI from the inputted TP information is well-known to any person of ordinary skill in the art, the redundant description will be omitted.

If it is determined that each of the PSI or SI is not identical to each other, the processor 240 returns to the step represented by 915 and writes the connection state of the respective satellite x in the memory 235.

If it is determined that each of the PSI or SI is identical to each other, the processor 240 determines, in a step represented by 930, whether both the first tuner 210a and the second tuner 210b are tuned by tuning any one of the first tuner 210a and the second tuner 210b having the TP information of different polarization properties.

For example, a state in which the first tuner 210a and the second tuner 210b, respectively, are tuned by using TP information of vertically polarized wave (hereinafter, referred to as "first TP information") is assumed. In the state, the processor 240 tunes the first tuner 210a by using TP information of horizontally polarized wave (hereinafter, referred to as "second TP information") and then determines whether the first tuner 210 and the second tuner 210b are tuned.

As a result, if the first tuner 210a is tuned only and the TP information is not inputted, the processor 240 recognizes and sets the connection state of the pertinent satellite x as at least the loop-through, in a step represented by 935.

If both the first tuner 210a and the second tuner 210b are tuned, that is, the first tuner 210a and the second tuner 210b, respectively, are tuned by using the TP information of different polarized wave, the processor 240 recognizes and sets the connection state of the concerned satellite x as at least the dual same in a step represented by 940.

The processor 240 can set the tuner connection state of the respective M satellites by repeating the steps represented by 910 through 940.

Figure 10:
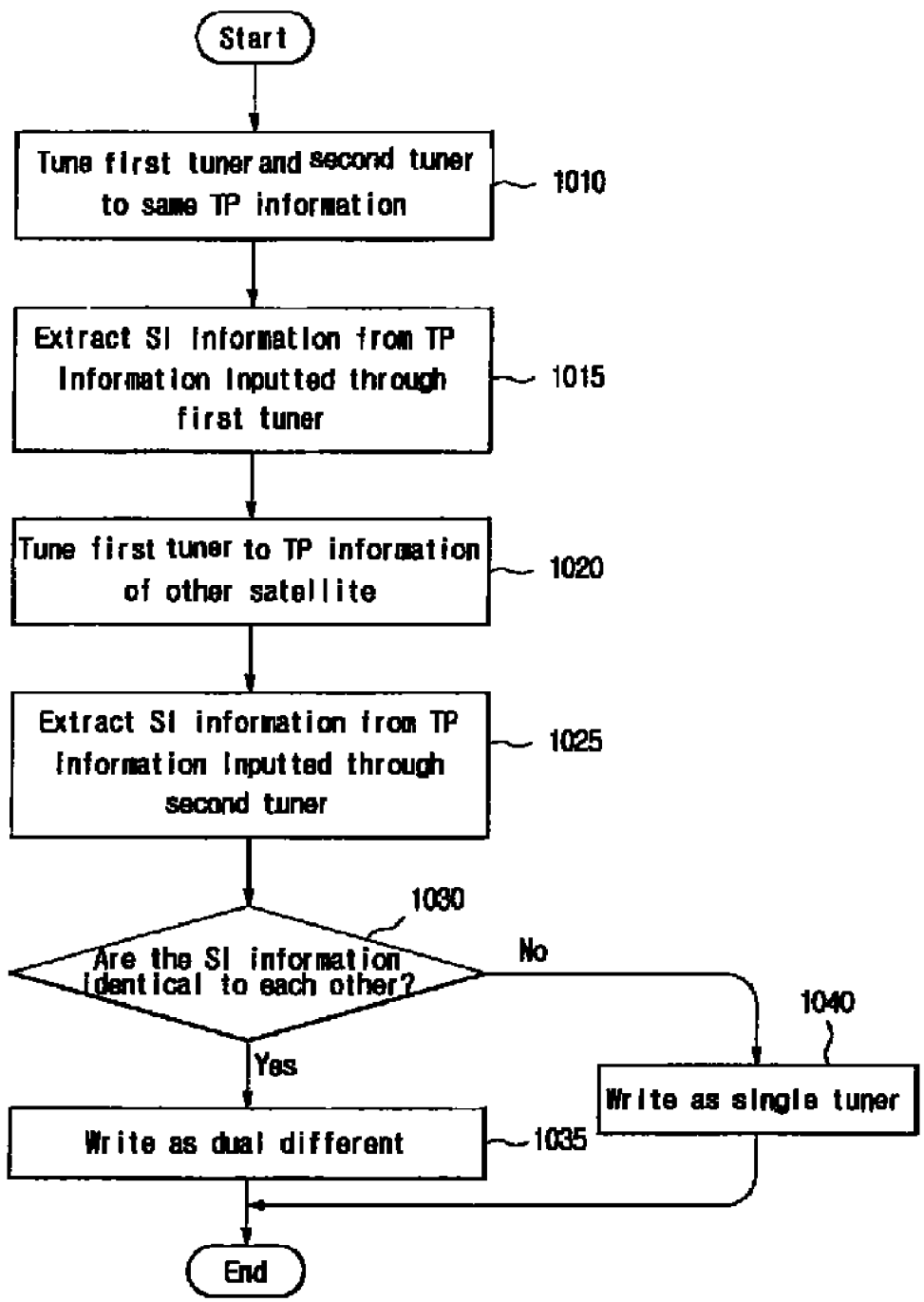
FIG. 10 is a flow chart illustrating a method of setting a connection state between satellites in accordance with an embodiment of the present invention.

FIG. 10 is a flow chart illustrating a method of setting a connection state of each satellite in accordance with the present invention. Assuming that all connection states of each satellite x of the diagonal group 810 are checked by first setting a connection state of M antennas in FIG. 9, the method of checking the connection state of each satellite of the first area 820 in FIG. 8 by use of the connection state of the concerned satellite x will be described below. That is, Since B and C are symmetrical with each other, the connection state of each satellite for any one of B and C will be described.

Although the below description relates to the method of setting the connection state for setting each of the M antenna, the method of setting the connection state of M satellites will be described for the convenience of understanding and description.

Further, the method of setting the connection state of each satellite after receiving the TP information corresponding to each satellite from the transponders corresponding to the two satellites will be described below.

The processor 240 first sets the connection state between the satellites logically and evidently deduced from the connection state of each satellite having the same antenna information, which is not illustrated in FIG. 10.

For example, if the connection state of the first satellite is the first single tuner, and the connection state of the second satellite is the first single tuner, the processor 240 sets the connection states of the first and second satellites as the first single tuner. If the first satellite and the second satellite, respectively, are the second single tuner, the processor 240 can set the connection states of the first satellite and the second satellite as the second single tuner.

If the connection state of the first satellite is any one of the first and second single tuners, and the connection state of the second satellite is the other, since the first satellite and the second satellite each can independently tune satellite signals that are physically different, the processor 240 sets the connection states of the first satellite and the second satellite as the dual different.

Also, if the connection state of the first satellite is any one of the first and second single tuners, and the connection state of the second satellite is the dual same, since it is possible that the first satellite and the second satellite independently tune to the first tuner and the second tuner, respectively, the processor 240 can set the connection states of the first satellite and the second satellite as the dual different.

Of course, if the connection state of the first satellite is the dual same, and the connection state of the second satellite is any one of the first and second single tuners, the processor 240 can similarly set the connection states of the first satellite and the second satellite as the dual different.

If the connection state of the first satellite is the loop-through, and the connection state of the second satellite is the dual same, since it is possible that the first satellite and the second satellite independently tune to the first tuner and the second tuner, respectively, the processor 240 can set the connection states of the first satellite and the second satellite as the dual different.

If the connection state of the first satellite and the second satellite, respectively is the dual same, since it is possible that the first satellite and the second satellite independently tune to the first tuner and the second tuner, respectively, the processor 240 can set the connection states of the first satellite and the second satellite as the dual same.

If the connection state of the first satellite is any one of the first and second single tuners, and the connection state of the second satellite is the loop-through, since it is possible that the first satellite and the second satellite independently tune to the first tuner and the second tuner, respectively, the processor 240 can set the connection states of the first satellite and the second satellite as the dual different.

If the connection state of the first satellite is the loop-through, and the connection state of the second satellite is any one of the first and second single tuners, since it is possible that the first satellite and the second satellite independently tune to the first tuner and the second tuner, respectively, the processor 240 can set the connection states of the first satellite and the second satellite as the dual different.

If the connection state of the first satellite is the loop-through, and the connection state of the second satellite is the loop-through, one of the two cases are possible. In one case, the first satellite and the second satellite can independently perform tuning at the same time. In the other case, the first satellite and the second satellite cannot independently perform tuning at the same time. Accordingly, in such a case, the connection state between the satellites may be checked and set through the following method. This method will be described in detail with reference to FIG. 10.

Referring to FIG. 10, the processor 240 tries, in a step represented by 1010, to tune the first tuner 210a and the second tuner 210b by using the same TP information (hereinafter, referred to as "third TP information"). For example, the processor 240 tunes the first tuner 210a by use of the third TP information before tuning the second tuner 210b by use of the third TP information.

In a step represented by 1015, the processor 240 obtains PSI or SI from the third TP information inputted through the first tuner 210a. Since the method of obtaining the PSI or SI is well-known to any person of ordinary skill in the art, the pertinent description will be omitted. For the convenience, the PSI or SI obtained from a satellite signal inputted through the first tuner 210a tuned with the third TP information will be referred to as third PSI information or third SI information.

In a step represented by 1020, the processor 240 tunes the first tuner 210a by using TP information (referred to as "fourth TP information", for the purpose of convenience) that is transmitted from a different satellite and is different from the third TP information.

In this state, if the third TP information tuned to the second tuner 210b is disconnected, the connection state of between two satellites can be recognized as at least the loop-through. The third TP information tuned to the second tuner 210b is not inputted, it can be inferred that the physical connection mode of the tuners 210a and 210b is the single tuner or the loop-through.

In a step represented by 1025, the control unit extracts PSI or SI (referred to as "fourth PSI or fourth SI" for the purpose of convenience) from a satellite signal inputted through the second tuner 210b tuned with the third TP information.

The processor 240 determines whether the third PSI or the third SI is identical to the fourth PSI or the fourth SI in a step represented by 1030.

As a result, if it is determined that the third PSI or the third SI is identical to the fourth PSI or the fourth SI, the processor 240 writes, in a step represented by 1035, in the memory 235 that the connection state between two satellites is the dual different.

Since that the third PSI or the third SI is identical to the fourth PSI or the fourth SI means that the second tuner 210b is not disconnected, this also means that the first satellite and the second satellite can independently perform tuning at the same time If it is determined that the third PSI or the third SI is not identical to the fourth PSI or the fourth SI, the processor 240 writes in the memory 235 that the connection state between two satellites is the single tuner, in a step represented by 1040. Of course, the connection state between the two satellites can be the loop-through. However, since the respective two satellites cannot independently tune, the connection state can be configured to be the single tuner, for the purpose of convenience.

The processor 240 checks and sets the connection state of every satellite by repeating the steps represented by 1010 through 1040.

INDUSTRIAL APPLICABILITY

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

The invention claimed is:

1. A method of setting a tuner connection state of n satellites, n being a natural number, the n satellites being connected to one or more antennas, the method being executed in a digital broadcast receiver comprising a plurality of tuners, the method comprising:
setting the tuner connection state for each of the n satellites by using a satellite signal received from each of the n satellites; and
setting the tuner connection state of the plurality of tuners between the n satellites by using a connection state set for each of the n satellites and the satellite signal received from each of the n satellites, wherein setting the tuner connection state for each of the n satellites comprises:
determining whether each of a first tuner and a second tuner is tuned by tuning each of the first tuner and the second tuner to a first satellite signal received from a satellite of the n satellites;
when each of the first tuner and the second tuner is tuned, extracting program specification information (PSI) or service information (SI) from the first satellite signal inputted through the first tuner and the second tuner, respectively, and determining whether the PSI or SI extracted from the first satellite signal inputted through the first tuner and the PSI or SI extracted from the first satellite signal inputted through the second tuner are identical to each other;
tuning any one of the first tuner or the second tuner to a second satellite signal having polarization properties different from the first satellite signal when it is determined that the PSI or SI extracted from the first satellite signal inputted through the first tuner and the PSI or SI extracted from the first satellite signal inputted through the second tuner are identical to each other; and
setting the tuner connection state of the satellite as dual same when the first tuner and the second tuner are tuned by the first satellite signal and the second satellite signal, respectively.

2. The method of claim 1, wherein each of the satellites comprises information on one antenna, and the antenna information comprises a combination of at least one or more items of low noise block down converter information, 22 KHz tone information, satellite information, or digital satellite equipment control information.

3. The method of claim 1, further comprising setting the tuner connection state of the satellite as single tuner when any one of the first tuner or the second tuner is not tuned to the second satellite signal.

4. The method of claim 1, further comprising setting the tuner connection state of the satellite as single tuner when the PSI or SI extracted from the first satellite signal inputted through the first tuner and the PSI or SI extracted from the first satellite signal inputted through the second tuner are not identical to each other.

5. The method of claim 1, further comprising setting the tuner connection state of the satellite as loop-through when one of the first tuner or the second tuner is tuned, and then the other of the first tuner or the second tuner is disconnected.

6. A method of setting a tuner connection state of n satellites, n being a natural number and the n satellites including at least first, second, third and fourth satellites, the n satellites being connected to one or more antennas, the method being executed in a digital broadcast receiver comprising a plurality of tuners, the method comprising:
setting the tuner connection state for each of the n satellites by using a satellite signal received from each of the n satellites; and
setting the tuner connection state of the plurality of tuners between the n satellites by using a connection state set for each of the n satellites, comprising:
tuning each of a first tuner and a second tuner to a third satellite signal;
extracting first program specification information (PSI) or first service information (SI) from the third satellite signal inputted through the first tuner;
tuning the first tuner to a fourth satellite signal, the fourth satellite signal being a signal for a satellite that is different from the satellite of the third satellite signal;
extracting second PSI or second SI from the third satellite signal inputted through the second tuner;
determining whether the extracted first PSI or first SI is identical to the extracted second PSI or second SI; and
setting the tuner connection state of the n satellites as dual different when the extracted first PSI or first SI is identical to the extracted second PSI or second SI.

7. The method of claim 6, further comprising setting the connection state between the n satellites as a single tuner when the extracted first PSI or first SI is not identical to the extracted second PSI or second SI.

8. The method of claim 6, further comprising setting the tuner connection state between the first satellite and the second satellite as first single tuner when the tuner connection state of the first satellite is first single tuner, and the tuner connection state of the second satellite is first single tuner.

9. The method of claim 6, further comprising setting the tuner connection state between the first satellite and the second satellite as dual different when the tuner connection state of the first satellite is loop-through, and the tuner connection state of the second satellite is dual same.

10. The method of claim 6, further comprising setting the tuner connection state between the first satellite and the second satellite as dual same when the tuner connection state of the first satellite is dual same, and the connection state of the second satellite is dual same.

11. The method of claim 6, further comprising setting the tuner connection state between the first satellite and the second satellite as dual different when the tuner connection state of the first satellite is any one of first single tuner or second single tuner, and the tuner connection state of the second satellite is dual same.

12. The method of claim 6, further comprising setting the tuner connection state between the first satellite and the second satellite as dual different when the tuner connection state of the first satellite is first single tuner, and the tuner connection state of the second satellite is second single tuner.

13. A digital broadcast receiver, comprising:
a plurality of tuners, receiving a satellite signal from each antenna transmitted from a satellite;

a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number and the N satellites, including at least first, second, third, fourth, fifth and sixth satellites, by use of the satellite signal inputted through the tuner, wherein the processor sets a connection state of the tuner for each of the N satellites, each satellite having information for one satellite, and then sets a tuner connection state between the N satellites by using the connection state set for each of the N satellites, wherein when each of a first tuner and a second tuner is tuned to a fifth satellite signal, the processor extracts program specification information (PSI) or service information (SI) from each of the first tuner and the second tuner and determines whether the PSI or SI extracted from the fifth satellite signal inputted through the first tuner and the PSI or SI extracted from the fifth satellite signal inputted through the second tuner are identical to each other, and when it is determined that the PSI or SI extracted from the fifth satellite signal in inputted through the first tuner and the PSI or SI extracted from the fifth satellite signal inputted through the second tuner are identical to each other, tunes one of the first tuner or the second tuner to a sixth satellite signal, the sixth satellite signal being a signal for a satellite that is different from the satellite of the fifth satellite signal, and then, when each of the first tuner and the second tuner is tuned by the fifth satellite signal and the sixth satellite signal, respectively, sets the tuner connection state of the satellite as dual same.

14. The digital broadcast receiver of claim 13, further comprising a memory storing the set tuner connection state between the N satellites.

15. The digital broadcast receiver of claim 13, wherein the processor tunes each of the first tuner and the second tuner using the fifth satellite signal received through a satellite, and when any one of the first tuner or the second tuner is not tuned, the processor sets the tuner connection of the satellite as a single tuner.

16. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number and the N satellites, including at least first, second, third, fourth, fifth and sixth satellites, by use of the satellite signal inputted through the tuner, wherein the processor sets a connection state of the tuner for each of the N satellites, each satellite having information for one satellite, and then sets a tuner connection state between the N satellites by using the connection state set for each of the N satellites, wherein the processor tunes any one of a first tuner or a second tuner to a sixth satellite signal and then sets the tuner connection state of the satellite as loop-through when any one of the first tuner or the second tuner is not tuned.

17. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, by use of the satellite signal inputted through the tuner, wherein the processor sets a connection state of the tuner for each of the N satellites, each satellite having information for one satellite, and then sets a tuner connection state between the satellites by using the connection state set for each of the N satellites, wherein the processor extracts program specification information (PSI) or service information (SI) from each of a first tuner and a second tuner and determines whether the PSI or SI extracted from the first tuner and the PSI or SI extracted from the second tuner are identical to each other, and, when it is determined that the PSI or SI extracted from the first tuner and the PSI or SI extracted from the second tuner are identical to each other, sets the tuner connection state of the satellite as single tuner.

18. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, by use of the satellite signal inputted through the tuner, wherein the processor sets a connection state of the tuner for each of the N satellites, each satellite having information for one satellite, and then sets a tuner connection state between the satellites by using the connection state set for each of the N satellites, wherein, when the connection state of each of a third satellite of the N satellites and a fourth satellite of the N satellites is first single tuner, the processor sets a tuner connection state between the third satellite and the fourth satellite as first single tuner, and when the connection state of each of the third satellite and the fourth satellite is second single tuner, the processor sets the tuner connection state between the third satellite and the fourth satellite as second single tuner.

19. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, by use of the satellite signal inputted through the tuner, wherein the processor sets a connection state of the tuner for each of the N satellite, each satellite having information for one satellite, and then sets a tuner connection state between the satellites by using the connection state set for each of the N satellites, wherein, when a connection state of a third satellite of the N satellites is one of first single tuner or second single tuner, and a connection state of a fourth satellite of the N satellites is the other of the first single tuner or second single tuner, the processor sets a tuner connection state between the third satellite and the fourth satellite as dual different.

20. A digital broadcast receiver, comprising:
a plurality of tuners, receiving a satellite signal from each antenna transmitted from a satellite;
a demodulator demodulating satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, by use of the satellite signal inputted through the tuner, wherein the processor sets a connection state of the tuner for each of the N satellites, each satellite having information for one satellite, and then sets a tuner connection state between the satellites by using the connection state set for each of the N satellites, wherein, when a connection state of a third satellite of the N satellites is one of first single tuner, second single tuner or loop-through, and a connection state of a fourth satellite of the N satellites is dual same, the processor sets a tuner connection state between the third satellite and the fourth satellite as dual different.

21. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, by use of the satellite signal inputted through the tuner, wherein the processor sets a connection state of the tuner for each of the N satellites, each satellite having information for one satellite, and then sets a tuner connection state between the satellites by using the connection state set for each of the N satellites, wherein, when a connection state of a third satellite of the N satellites is dual same, and a connection state of a fourth satellite of the N satellites is dual same, the processor sets a tuner connection state between the third satellite and the fourth satellite as dual different.

22. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, use of the satellite signal in inputted through the tuner, wherein the processor sets a connection state of the tuner for each of the N satellites, each satellite having information for one satellite, and then sets a tuner connection state between the satellites by using the connection state set for each of the N satellites, wherein, when a connection state of a third satellite of the N satellites is any one of first single tuner or second single tuner, and a connection state of a fourth satellite of the N satellites is loop-through, the processor sets a tuner connection state between the third satellite and the fourth satellite as dual different.

23. A digital broadcast receiver, comprising:
a plurality of tuners, receiving a satellite signal from each antenna transmitted from a satellite;
a demodulator demodulating the satellite signal;
a demultiplexer classifying the demodulated satellite signal in accordance with data type and outputting the classified data;
a decoder decoding each of the data classified by the demultiplexer; and
a processor setting a tuner connection state corresponding to N satellites, N being a natural number, by use of the satellite signal inputted through the tuner, wherein the processor sets a connection state of the tuner for each of the N satellites, each satellite having information for one satellite, and then sets a tuner connection state between the satellites by using the connection state set for each of the N satellites, wherein, when a connection state of each of a third satellite of the N satellites and a fourth satellite of the N satellites is loop-through, the processor determines whether a first tuner and a second tuner can be independently tuned at the same time and, when the first tuner and the second tuner can be independently tuned at the same time, the processor sets a tuner connection state between the third satellite and the fourth satellite as dual different.

24. The digital broadcast receiver of claim 23, wherein, when the first tuner and the second tuner can not be independently tuned at the same time, the processor sets a tuner connection state between the third satellite and the fourth satellite as single tuner.

* * * * *